United States Patent [19]

Taylor

[11] Patent Number: 4,877,377
[45] Date of Patent: Oct. 31, 1989

[54] ROTARY PUMP SYSTEM

[75] Inventor: Peter J. Taylor, Hants, England

[73] Assignee: Plessey Overseas Limited, Ilford, England

[21] Appl. No.: 211,286

[22] Filed: Jun. 24, 1988

[30] Foreign Application Priority Data

Jun. 25, 1987 [GB] United Kingdom ............... 8714986

[51] Int. Cl.[4] ............................................. F04B 23/14
[52] U.S. Cl. .......................................... 417/89; 417/87
[58] Field of Search ..................... 417/89, 88, 87, 85, 417/69

[56] References Cited

U.S. PATENT DOCUMENTS

| | | | |
|---|---|---|---|
| 2,883,936 | 4/1959 | Daddario | 417/89 |
| 2,902,206 | 9/1959 | Power | 417/87 |
| 3,551,073 | 12/1970 | Petrovits | 417/87 |
| 3,810,714 | 5/1974 | Turner | 417/89 |
| 4,294,573 | 10/1981 | Erickson et al. | 417/89 |
| 4,422,829 | 12/1983 | Buchanon | 417/89 |

FOREIGN PATENT DOCUMENTS

| | | | |
|---|---|---|---|
| 854499 | 10/1970 | Canada | 417/88 |
| 1574829 | 9/1980 | United Kingdom | 417/89 |

*Primary Examiner*—Donald E. Stout
*Attorney, Agent, or Firm*—Fleit, Jacobson, Cohn, Price, Holman & Stern

[57] ABSTRACT

A rotary pump system for pumping a liquid which is delivered under pressure from a backing pump 8, in which a rotary pump 1 has a pump body which is required to be drained of liquid at times when the pump 1 is inoperative, wherein the backing pump 8 has a bypass circuit between its inlet and outlet ports, the bypass circuit comprisng a multiphase pump 13 which has a suction inlet 14 connected to a drain point 16 on the pump 1 body and a vortex chamber 17 through which liquid passes from the pump 13 outlet to the backing pump 8 inlet, a central outlet 18 of said vortex chamber being connected to an inlet port 6 of said pump 1. This allows automatic draining of the pump 1 body when use of this pump is not required.

5 Claims, 1 Drawing Sheet

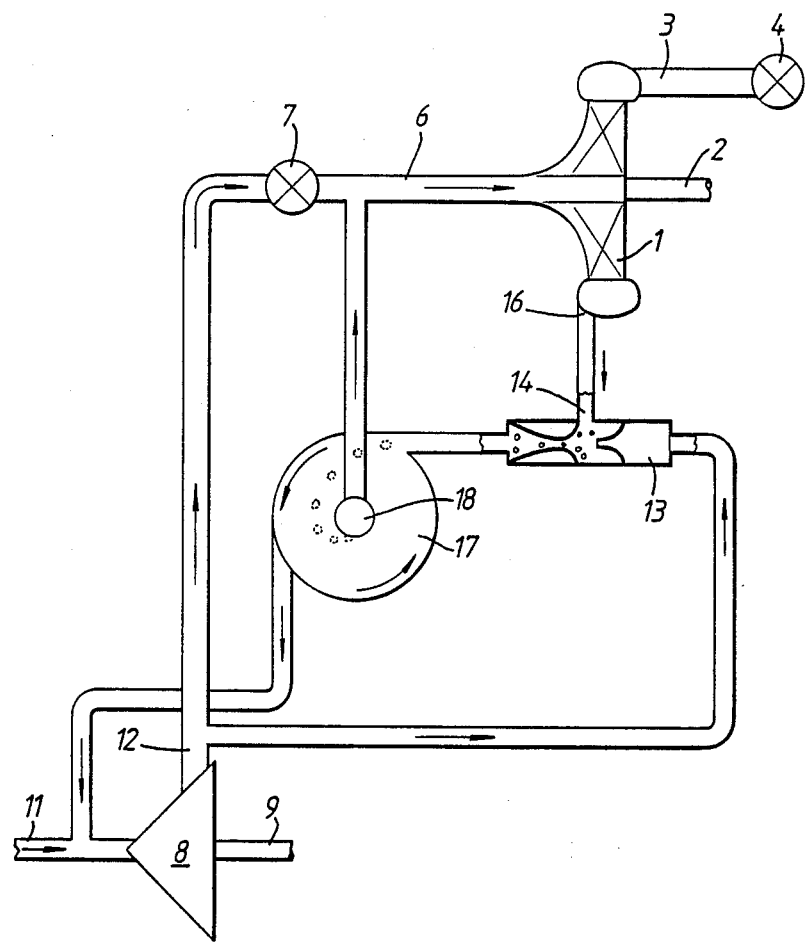

ROTARY PUMP SYSTEM

This invention relates to rotary pump systems. It relates particularly to a rotary pump system which is intended for intermittent use and which includes drainage means by which a body of the pump may be drained of the liquid for pumping whenever use of the pump is not required.

When a rotary pump is used only intermittently, it is convenient if the pump body can be drained of the liquid for pumping at times when pumping is not required. This enables some risk of external liquid spillage to be avoided but it may require the provision of a pump reservoir for temporary storage of the volume of liquid removed from the pump body.

The present invention was devised to provide a solution to this problem in a way which avoids the need to use a temporary storage reservoir.

According to the invention, there is provided a rotary pump system for pumping a liquid which is delivered under pressure from a backing pump, in which the rotary pump has a pump body which is required to be drained of the liquid at times when the rotary pump is inoperative, wherein the backing pump has a by-pass circuit between its inlet and outlet ports, the by-pass circuit comprising a multiphase pump which has a suction inlet connected to a drain point on the rotary pump body and a vortex chamber through which liquid passes from the multiphase pump outlet to the backing pump inlet, a central outlet of said vortex chamber being connected to an inlet port of said rotary pump.

An outlet port of the rotary pump may include a discharge valve, such as a non-return discharge valve. An inlet port of the rotary pump may be closed by an inlet valve.

The rotary pump system is particularly suitable for being used in an aircraft where, for example, it could supply fuel intended for an engine reheat stage. Removing the volume of fuel lying in the body of the pump can be done in a way which will tend to minimise any temperature rise which may occur when the engine is operated under non-heat conditions.

By way of example, a particular embodiment of the invention will now be described with reference to the accompanying drawing, the single FIGURE of which shows a rotary pump system for a liquid fuel supply.

As shown in the FIGURE, the pump system comprises a rotary pump which in this embodiment is the centrifugal pump 1 which is driven by a motor shaft 2 and has a pump outlet 3 leading to a non-return valve 4. In the present embodiment, the system is intended for used in an aircraft to provide a pressurised reheat fuel supply. The valve 4 is thus connected to the appropriate reheat part of the aircraft engine.

The valve 4 is a simple flap valve arranged so that it will close automatically at any time when there is a vacuum at the pump rotor side of the valve.

The centrifugal pump 1 also has a pump inlet 6 which is connected through an inlet valve 7 to a backing pump 8. The backing pump 8 is driven by a motor shaft 9 and its purpose is to draw fuel from a reservoir (not shown) to a backing pump inlet 11 and this fuel is then supplied under pressure to the backing pump outlet 12 and thus to the centrifugal pump 1.

The pressurized supply of fuel at the backing pump outlet 12 is also capable of flowing through an alternative route which includes a multiphase pump. In this embodiment, the multiphase pump is a fluid jet pump 13 which has a suction inlet 14 connected to a drain point 16 on a body of the centrifugal pump 1. An outlet from the jet pump 13 leads the fuel to a vortex chamber 17. An outlet on the periphery of the chamber 17 feeds the bulk of the fuel volume back to the backing pump inlet 11. A second vortex chamber outlet 18 on the axis of the chamber 17 feeds a proportion of the fuel volume having a lower density to the centrifugal pump inlet 6. This proportion of the fuel volume will include air bubbles which are freed from solution in the fuel as a result of the pressure differences in the chamber 17.

In operation of the rotary pump system to supply fuel to a reheat motor stage of an aircraft engine, the backing pump 8 and the centrifugal pump 1 are both operated continuously during flight of the aircraft.

Since the mechanical drive to the centrifugal pump 1 operates continuously, when the fuel is being pumped for the reheat operation the pump can consume some sixty horsepower. When reheat operation is not required, the supply of fuel to the pump is shut off by closing the valve 7 and the pump rotor then runs in an idle condition with a consequent saving in the power consumed. In this state, it is conveient if a small amount of fuel and air is allowed to pass through the pump in order to promote cooling of the rotor and its bearings.

In order to start reheat power, the inlet valve 7 is opened. This causes pressurised fuel to be pumped through the non-return discharge valve 4 to the reheat stage of the aircraft engine.

When reheat power is no longer required, the valve 7 is closed. The backing pump 8 continues to operate and the fuel passing through this pump is diverted round the by-pass section which includes the fluid jet pump 13. The jet pump 13 is now operated by the pressurized fuel from the pump 8 and it produces a reduction of pressure at the suction inlet 14 which draws the quantity of fuel remaining in the body of the pump 1 out from the drain point 16.

The volume of fuel leaving the jet pump 13 serves to operate the vortex chamber 17 so that a swirling mass of fuel is formed within the chamber. Centrifugal force causes the mass of fuel to be at a high pressure on the periphery of the chamber whilst a low pressure exists on the axis of the chamber. The high pressure fuel on the vortex chamber periphery is fed back to the backing pump inlet 11.

The low pressure fuel on the vortex chamber axis experiences the release of air dissolved in the fuel and the mixture of fuel with released air is delivered to the centrifugal pump inlet 6. If the reheat operation should now be selected, the fuel pressure at the pump 1 outlet will be sharply increased by some hundreds of pounds per square inch and this will cause the released air to be reabsorbed into the fuel volume.

The foregoing description of an embodiment of the invention has been given by way of example only and a number of modifications may be made without departing from the scope of the invention as defined in the appended claims. For instance, it is not essential that the invention should be applied only to the handling of liquid fuel or to an aircraft reheat burner fuel supply. The invention could be applied readily to other liquid systems in an aircraft and additional connections to the suction inlet 14 could serve for example to drain fuel from a drain gallery on an engine after the engine has been shut down, or in a scavenge system to remove liquid such as condensation water from a lodgement area.

The multiphase pump is not limited to being a jet pump and in a different embodiment an alternative construction could be used such as a liquid ring pump.

The invention is also not limited to use on aircraft and it could be applied usefully in other installations, such as on ships or in industry.

I claim:

1. A rotary pump system for pumping a liquid which is delivered under pressure from a backing pump, in which the rotary pump has a pump body which is required to be drained of liquid at times when the rotary pump is inoperative, wherein the backing pump has a by-pass circuit between its inlet and outlet ports, the by-pass circuit comprising a multiphase pump which has a suction inlet connected to a drain point on the rotary pump body and a vortex chamber through which liquid passes from the multiphase pump outlet to the backing pump inlet, a central outlet of said vortex chamber being connected to an inlet port of said rotary pump.

2. A pump system as claimed in claim 1, in which the said rotary pump is a centrifugal pump.

3. A pump system as claimed in claim 1, in which an outlet port of said rotary pump includes a discharge valve.

4. A pump system as claimed in claim 1, in which the multiphase pump is a fluid jet pump.

5. An aircraft, including a rotary pump system as claimed in claim 1.

* * * * *